US012253831B2

(12) United States Patent
Ershov et al.

(10) Patent No.: US 12,253,831 B2
(45) Date of Patent: Mar. 18, 2025

(54) WATCH WITH BAND DEVICE

(71) Applicant: Apple Inc., Cupertino, CA (US)

(72) Inventors: Michael J. Ershov, Escondido, CA (US); Travis J. McQueen, Lee, NH (US)

(73) Assignee: Apple Inc., Cupertino, CA (US)

( * ) Notice: Subject to any disclaimer, the term of this patent is extended or adjusted under 35 U.S.C. 154(b) by 461 days.

(21) Appl. No.: 17/721,250

(22) Filed: Apr. 14, 2022

(65) Prior Publication Data

US 2023/0004129 A1 Jan. 5, 2023

Related U.S. Application Data

(60) Provisional application No. 63/217,691, filed on Jul. 1, 2021.

(51) Int. Cl.

*G04G 21/02* (2010.01)
*A44C 5/00* (2006.01)
*G04G 9/00* (2006.01)

(52) U.S. Cl.

CPC ......... *G04G 21/025* (2013.01); *A44C 5/0053* (2013.01); *G04G 9/007* (2013.01)

(58) Field of Classification Search

CPC .. G04G 9/007; G04G 21/025; G04B 37/1486; A44C 5/14; A44C 5/147

See application file for complete search history.

(56) References Cited

U.S. PATENT DOCUMENTS

| | | | | |
|---|---|---|---|---|
| 4,060,185 | A * | 11/1977 | Kuroda .................. | A44C 5/147 63/11 |
| 4,958,279 | A * | 9/1990 | Proellochs ......... | G04B 37/1433 968/351 |
| 2002/0085455 | A1* | 7/2002 | Haida ................ | G04B 37/1486 368/317 |
| 2015/0313542 | A1 | 11/2015 | Goldberg et al. | |
| 2018/0059714 | A1 | 3/2018 | Martin et al. | |
| 2018/0070840 | A1 | 3/2018 | Cronin et al. | |
| 2018/0150033 | A1 | 5/2018 | Lake et al. | |
| 2020/0050154 | A1 | 2/2020 | Spencer et al. | |
| 2020/0272106 | A1 | 8/2020 | Johnson | |
| 2021/0181691 | A1 | 6/2021 | Rothkopf et al. | |

OTHER PUBLICATIONS

International Search Report and Written Opinion from PCT/US2022/034378, dated Oct. 7, 2022, 11 pages.

* cited by examiner

*Primary Examiner* — Edwin A. Leon
*Assistant Examiner* — Jason M Collins
(74) *Attorney, Agent, or Firm* — BAKERHOSTETLER

(57) ABSTRACT

Wearable electronic devices, such as watches, can include a watch body and a band device that can be used together or independently of one another. The band device can provide continual operation of its functions even in the absence of the watch body. The assembly of the watch body and the band device can provide secure engagement, communication, and power sharing. Accordingly, neither the watch body nor the band device need to independently include components that provide every function that will be desired by the user. Instead, functions that are desired on a continual or long-term basis can be provided by the band device, and functions that are desired on an intermittent or short-term basis can be provided by the watch body.

20 Claims, 5 Drawing Sheets

WATCH WITH BAND DEVICE

CROSS-REFERENCE TO RELATED APPLICATION

This application claims the benefit of U.S. Provisional Application No. 63/217,691, entitled "WATCH WITH BAND DEVICE," filed Jul. 1, 2021, the entirety of which is incorporated herein by reference.

TECHNICAL FIELD

The present description relates generally to wearable devices, and, more particularly, to watches with band devices.

BACKGROUND

Electronic devices that can be worn on a user's wrist and do more than act as a simple time piece are growing in popularity. A variety of wearable electronic devices, including watches, have been developed that include components to provide a variety of functions. For example, some wearable electronic devices include one or more sensors to measure various characteristics of the user and/or the environment in which the device operates. Such devices may include a display to indicate the time and date. The devices may also include accelerometers and one or more sensors that enable a user to track fitness activities and health-related characteristics, such as heart rate, blood pressure, and body temperature, among other information. The devices also typically include a rechargeable battery that powers the electronics within the device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
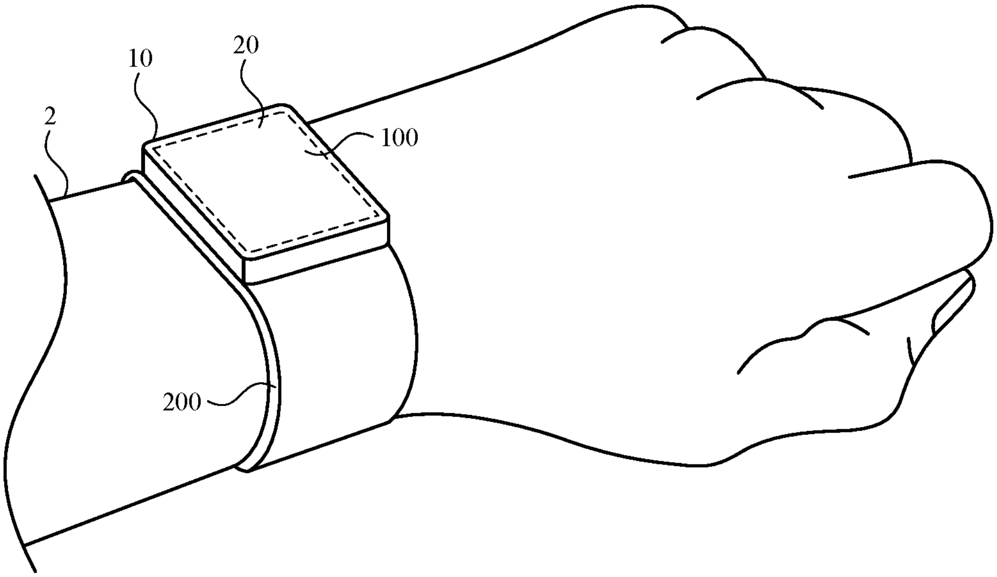
FIG. 1 illustrates a perspective view of a watch on a wrist of a user, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Wearable electronic devices, including watches, can perform a range of functions that is determined by the components (e.g., sensors, circuitry, and other hardware) included with the wearable device as manufactured. However, space, cost, and other considerations may limit the ability to provide, at every given moment, every component that might provide a desired function. For example, a user may choose to remove the watch to charge the battery thereof. By further example, the user may remove the watch for certain activities or for certain occasions. However, removing the entire watch from the user for charging or other purposes would prevent the watch from being able to perform its functions with respect to the user, such as tracking biometrics of the user with bio-sensors of the watch.

Given the multiple occasions on which a user may need or desire to remove at least a portion of a watch, it would be beneficial to provide an ability for other portions of the watch to remain with the user. Such an ability would allow the watch to continually monitor the health metrics of the user and/or other conditions even when the user removes other portions of the watch. Wearable electronic devices, including watches, of the present disclosure facilitate operation in multiple modes to provide the user with the opportunity to remove some components while still receiving the continued benefits of at least some functions.

Systems of the present disclosure can provide a watch with a watch body and a band device that can be used together or independently of one another. The band device can provide continual operation of its functions even in the absence of the watch body. The assembly of the watch body and the band device can provide secure engagement, communication, and power sharing. Accordingly, neither the watch body nor the band device need to independently include components that provide every function that will be desired by the user. Instead, functions that are desired on a continual or long-term basis can be provided by the band device, and functions that are desired on an intermittent or short-term basis can be provided by the watch body.

These and other embodiments are discussed below with reference to FIGS. 1-8. However, those skilled in the art will readily appreciate that the detailed description given herein with respect to these Figures is for explanatory purposes only and should not be construed as limiting.

According to some embodiments, for example as shown in FIG. 1, a watch 10 includes a watch body 100 that is worn on a wrist 2 with a band device 200. The watch body 100 can be portable and also attached to other body parts of the user and/or to other devices, structures, or objects. The band device 200 can be flexible and encircle at least a portion of the wrist 2 of a user. By securing the watch body 100 to the person of the user, the band device 200 provides security and convenience. In some embodiments, the watch body 100 includes a display 20 and a housing for containing components. The watch body 100 and the band device 200 can communicate with each other and operate in concert at least while connected to each other.

It will be appreciated that the teachings relating to a watch can be applied to other electronic devices, including wearable and/or portable computing devices. Examples include timekeeping devices, computerized glasses, navigation devices, sports devices, accessory devices, health-monitoring devices, medical devices, wristbands, bracelets, jewelry, and/or the like.

Figure 2:
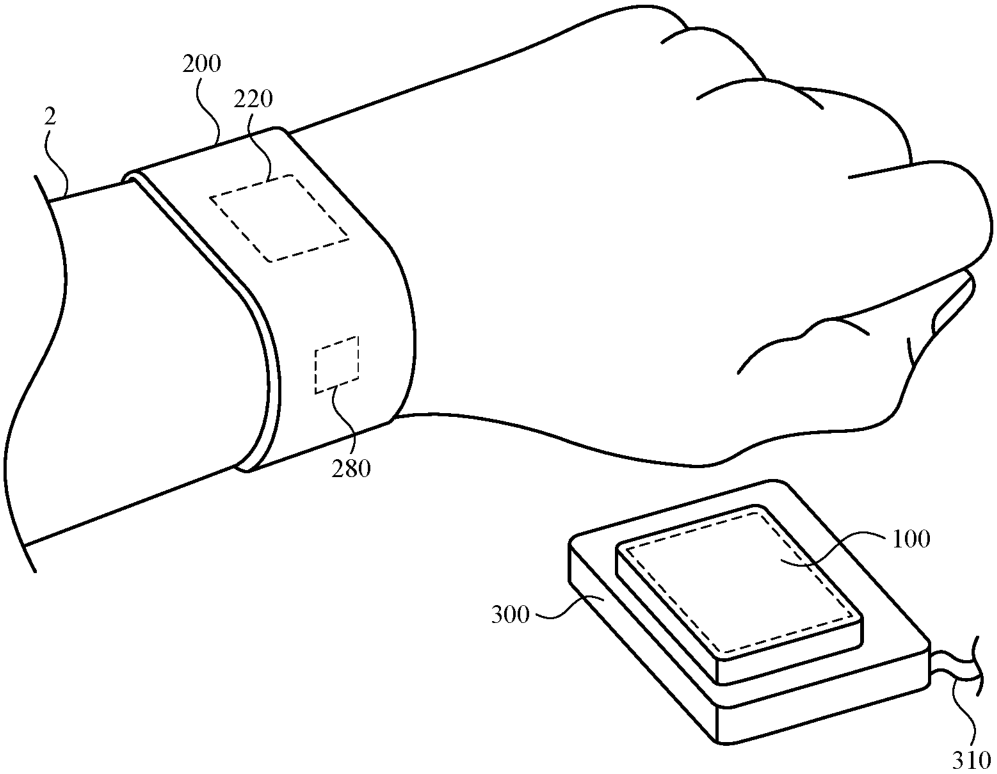
FIG. 2 illustrates a perspective view of a band device of the watch of FIG. 1 on the wrist of the user with the watch body on a charger, according to some embodiments of the present disclosure.

According to some embodiments, for example as shown in FIG. 2, the watch body 100 can be separated from the band device 200 and removed from the wrist 2 of the user, and the band device 200 can remain on the wrist 2 of the user. The watch body 100 can be stored away from the band device 200, for example on a charger device 300 connected to a power source 310. Both the watch body 100 and the band device 200 can continue to operate and provide their respective functions while separated. For example, the band device 200 can include an electronic component 280, such as a sensor, that can be operated independently of the watch body 100. Such a sensor can continually monitor health metrics of the user or other conditions even when the watch body 100 is absent. When the watch body 100 is returned to the band device 200, a band communication element 220 of the band device 200 can transmit to the watch body 100 recorded information, for example, relating to health metrics of the user or other conditions.

By providing a band device 200 that with continual operation, the user can enjoy a greater range of options with respect to the watch body 100 without sacrificing the functions provided by the band device 200. For example, the user can remove the watch body 100 at night to recharge its battery and continue to wear the band device 200 for ongoing monitoring. Such monitoring can include sleep tracking (e.g., movement, heart rate, etc.). Accordingly, such monitoring can be performed while the watch body 100 recharges, and the user can receive the benefit of the monitoring and the battery charge of the watch body for the next day. Furthermore, such monitoring can be performed continuously throughout an entire day and across several days without requiring interruptions to enable recharging.

By way of further example, the user can elect to remove the watch body 100 for certain activities, such as exercising. The watch body 100 can be removed to protect it from potential harm, to reduce weight on the user, or to perform other functions elsewhere. During a session of activity or exercise, the band device 200 can provide the functions relevant to such activity, such as activity tracking (e.g., movement, heart rate, etc.). Accordingly, the user can receive the benefit of the monitoring by wearing only the band device 200 during a session.

By way of further example, the user can elect to remove the watch body 100 to alter an aesthetic appearance of the watch. On certain occasions, the user may prefer the aesthetic or cosmetic properties (e.g., color, patterns, and/or materials), ergonomic features, shape, size, flexibility, and/or tactile feel of the band device 200 without the watch body 100. Additionally or alternatively, different watch bodies 100 can be paired with any given band device 200 to provide different aesthetic features, cosmetic features, and/or a look and feel.

Figure 3:
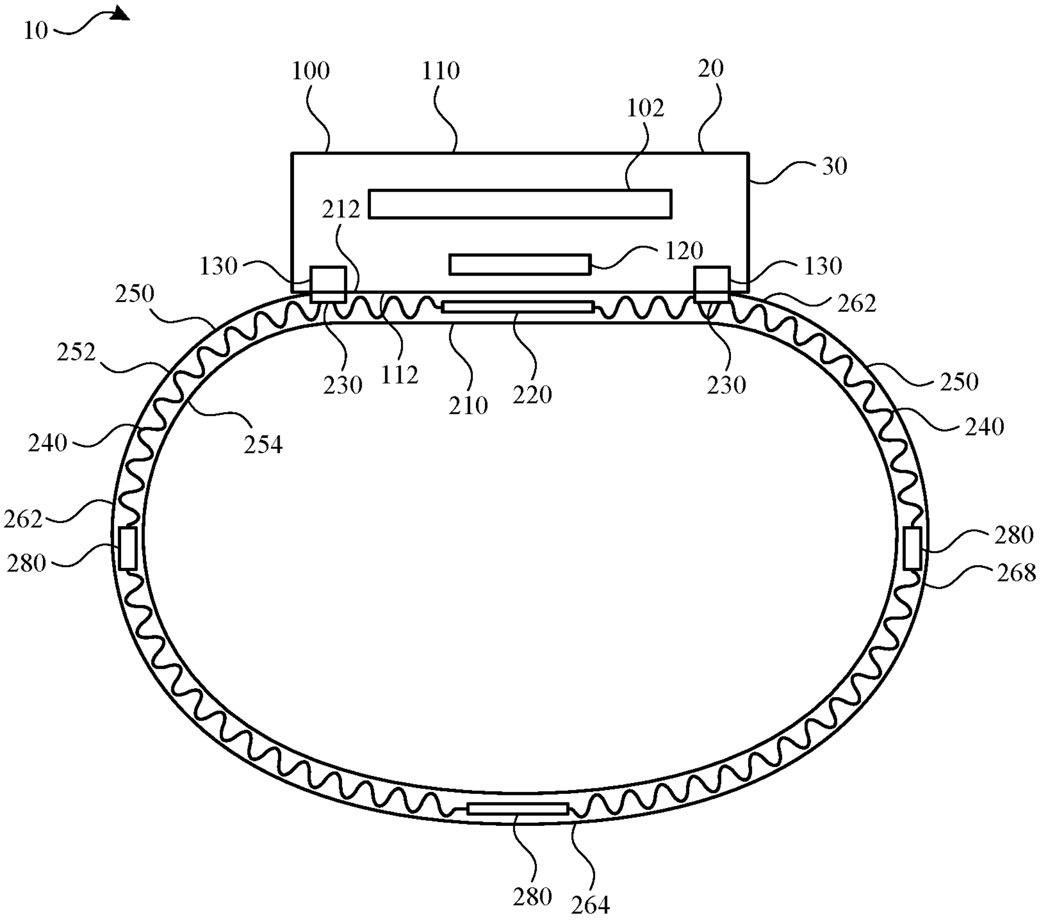
FIG. 3 illustrates a side sectional view of a watch including a watch body and a band device, in accordance with some embodiments of the present disclosure.

FIG. 3 illustrates a watch 10 including the watch body 100 that is useable with a band device 200, according to one or more embodiments of the present disclosure.

The watch body 100 can include one or more I/O systems. For example, the watch body 100 can include a display 20 configured to output various information about the watch 10. The display 20 of the watch body 100 can also be configured to receive touch input from a user. The watch body 100 can also have other input and output mechanisms. For example, the watch body 100 can include or interface with one or more buttons, a crown, keys, dials, trackpads, microphones and the like.

The watch body 100 can include a watch housing 30 that serves to surround a peripheral region of the watch body 100 as well as support the internal components of the watch body 100 in their assembled position. For example, the watch housing 30 encloses and supports various internal components (including for example integrated circuit chips, processors, memory devices and other circuitry) to provide computing and functional operations for the watch 10. The watch housing 30 can optionally include a rigid material, such as a metal, ceramic, plastic, and the like.

The watch 10 can utilize a band device 200 for coupling to a wrist. The band device 200 can include a band body 250 that defines an outer surface 252 and an inner surface of the band device 200. In some embodiments, the band body 250 can encase (e.g., entirely surround) one or more components of the band device 200, such as the band communication element 220, the electronic components 280, and/or the connector 240. Alternatively, the band body 250 can permit at least a portion of one or more of the components contained therein to be exposed at a surface thereof.

In some embodiments, the band body 250 can define a continuous loop structure. For example, the band body 250 can form a closed loop, monolithic, and/or one-piece configuration capable of being elastically stretched to fit over a user's hand and contractible to comfortably and securely fit over the user's wrist to maintain contact for the sensors without being overly tight. The material of the band body 250 may include one or more elastomers, silicones, fluorosilicones, urethanes, synthetic thermosets, and any combination thereof. However, the various embodiments of the present disclosure are not limited to the aforementioned materials, but may apply to any material capable of achieving the desired fit characteristics. In some embodiments, elastic material of the band body 250 may have a hardness of between about 20 A and about 100 A shore. The band body 250 can be formed by over-molding with respect to the other components of the band device 200.

Alternatively, the band body 250 can be configured to be releasably attached or secured to itself using a clasp or other attachment mechanism to form a loop. This loop can then be used to secure to a user's wrist. The loop can be secured (e.g., at a clasp) by one or more releasable locking mechanisms. For example, mechanisms such as locks, latches, snaps, screws, clasps, threads, magnets, and/or pins can be included to lock the band device 200 to the wrist of the user. The band device 200 can optionally remain locked from removal until a release mechanism is actuated. The release mechanism can be provided on an outer surface of the band device 200 for access by a user. For example, the release mechanism can be provided on an outer surface of the band device 200 and/or at a clasp.

The band body 250 can include natural and/or synthetic materials. The band body 250 can include, for example, leather, woven materials, non-woven materials, felt, metal, mesh, links, and/or the like. While the band body 250 is shown as forming a monolithic structure, it will be understood that the band body 250 can additionally or alternatively include multiple parts. Where multiple materials are used, each material may have different structural properties, tactile feel, and/or appearance. In some cases, the materials are selected to provide a band having composite properties: a first set of properties (associated with a first material) for an inner layer that comes in contact with a user's skin, and a second set of properties (associated with a second material) for an outer layer that is visible and exposed to various environmental elements.

As further shown in FIG. 3, the watch body 100 includes the housing 30 having an outer side 110 and an inner side 112 opposite the outer side 110. The outer side 110 (e.g., at the display 20) faces away from a wrist of the user when the watch 10 is worn, and the inner side 112 faces toward the wrist of the user when the watch 10 is worn. The body can include a controller 102 for controlling operations of the watch body 100 and/or the band device 200.

The band device 200 is attachable, for example, to the inner side 112 of the housing 30. When the band device 200 is attached to the housing 30, the electronic component 280 (e.g., sensor) of the band device 200 is operably connected to the controller 102 of the watch body 100. As shown in FIG. 3, the band device 200 forms an outer side 210 and an inner side 212 opposite the outer side 210. The inner side 212 faces toward the watch body 100 and away from a wrist of the user when the watch 10 is worn. The outer side 210 faces away from the watch body 100 and toward the wrist of the user when the watch 10 is worn.

The watch body 100 can include one or more body engagement elements 130, and the band device 200 can include one or more band engagement elements 230. The body engagement elements 130 and the band engagement elements 230 facilitate mechanical coupling or connection of the watch body 100 and the band device 200. The body engagement elements 130 and the band engagement elements 230 can include one or more of a variety of features, as discussed further herein. While opposing blocks are depicted in FIG. 3, it will be recognized that other attachment and securement features, such as magnets, locks, latches, snaps, screws, clasps, threads, and/or pins can be included on the watch body 100 and/or the band device 200 for securely attaching the band device 200 to the watch body 100. It will be understood that some types of engagement elements, such as magnets, can facilitate engagement while remaining fully encased within the band body 250.

By further example, the watch body 100 can include one or more body communication elements 120, and the band device 200 can include one or more band communication elements 220. The body communication elements 120 and the band communication elements 220 can facilitate a communication and/or power link between the watch body 100 and the band device 200. The body communication elements 120 and the band communication elements 220 can include one or more of a variety of features, as discussed further herein. While simple blocks are depicted in FIG. 3, it will be recognized that one or more of a variety of communication links can be provided, such as wireless receivers/transmitters, inductive coupling features (e.g., coils), electrical connectors, pogo pins, and/or conductive surfaces can be included with the watch body 100 and/or the band device 200 for coupling the electronic component 280 of the band device 200 to the controller 102 of the watch body 100 for power and/or communication exchange. It will be understood that some types of communication elements, such as wireless receivers/transmitters and/or inductive coupling features (e.g., coils), can facilitate communication while remaining fully encased within the band body 250.

The band device 200 can include one or more electronic components 280 that provide communication, access, or other functions on or through the band device 200. While selected electronic components 280 are depicted in FIG. 3, it will be understood that one or more of a variety of components, including electronic components, can be provided by the band device 200, as discussed further herein. For example, the electronic components 280 can include one or more sensors, one or more health sensors, one or more environmental sensors, one or more batteries, one or more communication components, one or more I/O components, one or more communication elements, and/or one or more audio devices, one or more optical devices, and/or one or more haptic devices. By further example, the band device 200 can include a display (e.g., LCD, LED, and the like) to provide visual output, for example, including an indication of a status and/or other information corresponding to the sensed condition(s) detected by the sensor(s). The electronic components 280 can include circuitry and/or structures to support the functions provided by the electronic components 280.

While the electronic components 280 of FIG. 3 are represented as rectangles at particular locations, it will be understood that the electronic components 280 can be of any size, shape, and/or arrangement. For example, the electronic components 280 can be square, rectangular, polygonal, round, curved, arcuate, circular, semi-circular, flat, or another shape. The electronic components 280 (e.g., sensors) can be the same size, different sizes, the same shape, or different shapes. The electronic components 280 (e.g., sensors) can be distributed in a pattern or another arrangement along and/or near an inner and/or outer surface of the band device 200. The electronic components 280 can extend along an inner and/or outer surface of the band device 200 and/or extend into or through the width of the band device 200 (e.g., between and to opposing sides of the band device 200).

Where the electronic components 280 or other components of the watch body 100 include an optical device, such as an optical sensor, the band device 200 can provide one or more windows forming optical pathways to transmit light to and/or from a sensor of the band device 200 and/or of the watch body 100. With light transmitted through the windows, an optical (e.g., photoplethysmography or PPG) sensor or sensors can be used to compute various biometric characteristics including, without limitation, a heart rate, a respiration rate, blood oxygenation level, a blood volume estimate, blood pressure, or a combination thereof. The windows can form an opening, a transmission medium, an optical filter, and/or a lens. It will be appreciated that any number of windows can be provided. One or more windows can provide transmission of light from a light-emitting device within the band device 200 and/or of the watch body 100. One or more windows can provide transmission of light to a light-detecting device (e.g., sensor) within the band device 200 and/or of the watch body 100. The windows can be of any size, shape, and arrangement. For example, the windows can be arranged to align with a sensor and/or a target region or regions of the user when the watch is worn by the user. As described herein, the band device 200 and/or the watch body 100 can include a display to provide visual output, for example, including an indication of a status and/or other information corresponding to the sensed condition(s) detected by the sensor(s).

Additionally or alternatively, the band device 200 can provide one or more electrodes to provide an electrically conductive pathway through or along the band device 200.

The electrodes can be operated to perform an electrical measurement, for example, to measure electrocardiographic (ECG) characteristics, galvanic skin resistance, and other electrical properties of the user's body and/or the environment. It will be appreciated that any number of electrodes can be provided. Each electrode can be insulated from other electrodes and/or other components of the watch. One or more electrodes can operate as a first terminal, and one or more electrodes can operate as an additional terminal. The electrodes can be of any size, shape, and arrangement. For example, the electrodes can be arranged to align with a target region or regions of the user when the watch is worn by the user.

Additionally or alternatively, the band device 200 can provide one or more other electronic components 280 providing other functionality. The one or more electronic components 280 can provide of facilitate measurements of body temperature, exposure to UV radiation, and other health-related information. The one or more electronic components 280 can provide or facilitate measurements of body temperature, exposure to UV radiation, and other health-related information. The one or more electronic components 280 can be configured to provide or facilitate detection of images, pressure, light, touch, force, temperature, position, motion, and so on. The one or more electronic components 280 can include or facilitate operation of a temperature sensor, a light or optical sensor, an atmospheric pressure sensor, a humidity sensor, a magnet, a gyroscope, an accelerometer, and so on. The one or more electronic components 280 can include an opening extending partially or entirely through the band device 200 to provide exposure to an external environment, for example, for measurements.

Various sensors of the band device 200 can be operated as electronic components 280 to detect wrist, hand, and/or arm movement of the user. For example, one or more IMUs may include an accelerometer, gyroscope, and/or magnetometer (e.g., compass) for sensing bulk motions of the user's wrist and arm. By further example, distributed pressure sensors and/or strain gauges on or within band device 200 can be used measure pressure variations on the band body 250 when the user makes wrist and/or hand gestures. By further example, a proximity sensor and/or an array of proximity sensors (e.g., optical or ultrasonic proximity sensors) may be used to measure wrist flexing (e.g., using measurements of changes in the distance between the wrist interface surface (s) and the wrist) and/or scribbling by the users other hand on the user's own hand (e.g., by measuring changing distances of the user's other finger from a proximity sensor on a sidewall of band device 200. By further example, one or more EMG sensors can detect electrical activity in the wearer's muscle tissue when the wearer moves a hand, wrist, or arm. By further example, ultrasound sensor and/or an ultrasound imager may be used to project ultrasonic signals into the wearer's wrist and receive reflected ultrasonic signals to monitor the muscle/tendon motion within the user's wrist. By further example, lidar sensors may include a laser-emitting source and a light detector that detects reflections of the emitted laser light. By further example, an RF sensor may include an RF receiver, transmitter, or transceiver that receives RF signals from, or transmits RF signals to, a corresponding RF device on another device on the other wrist to facilitate gesture detection based on two-hand relative motion or positioning. By further example, optical blood oxygen sensor may be used to measure blood concentration under the surface of the skin due to contact pressure change caused by wrist motions.

It will be understood that the electronic components 280 can be positioned at any one or more of a variety of locations along the band device 200. For example, at least one electronic component 280 can be positioned opposite the band communication element 220, the band engagement elements 230, and/or the watch body 100 on a palm side 264 (e.g., to align with or near a central zone at a volar or palm side of the wrist) of the band device 200. In some examples, a sensor positioned at such a location can provide more accurate measurements than at other locations. For example, one or more sensors can perform measurements on a side of the band device 200 that is opposite the band communication element 220, the band engagement elements 230, and/or the watch body 100. Such sensors can optionally include a PPG sensor, a tendon grip sensor, and/or a temperature sensor. By further example, as shown in FIG. 3, one or more electronic components 280 (e.g., sensors) can be positioned at one or both of a radial side 266 and/or an ulnar side 268 (e.g., to align with or near radial and/or ulnar zones of the wrist) of the band device 200. Such sensors can optionally include an ambient light sensor and/or a microphone. By further example, at least one the electronic components (e.g., sensors) can be positioned on a same side as the band communication element 220, the band engagement elements 230, and/or the watch body 100 on a dorsal side 262 (e.g., on a central zone at a dorsal or back side of the wrist) of the band device 200. Such sensors can optionally include an accelerometer and/or IMU. It will be understood that measurements from multiple sensors at different locations can be combined to create a composite measurement. It will be further understood that such sensors can be provided in any number and on any side of the band device 200 to detect conditions as a corresponding location on the user. The electronic component 280 can further include an antenna that can extend across any length of the band device 200, thereby enhancing the effectiveness of reception and transmission therewith.

Figure 4:
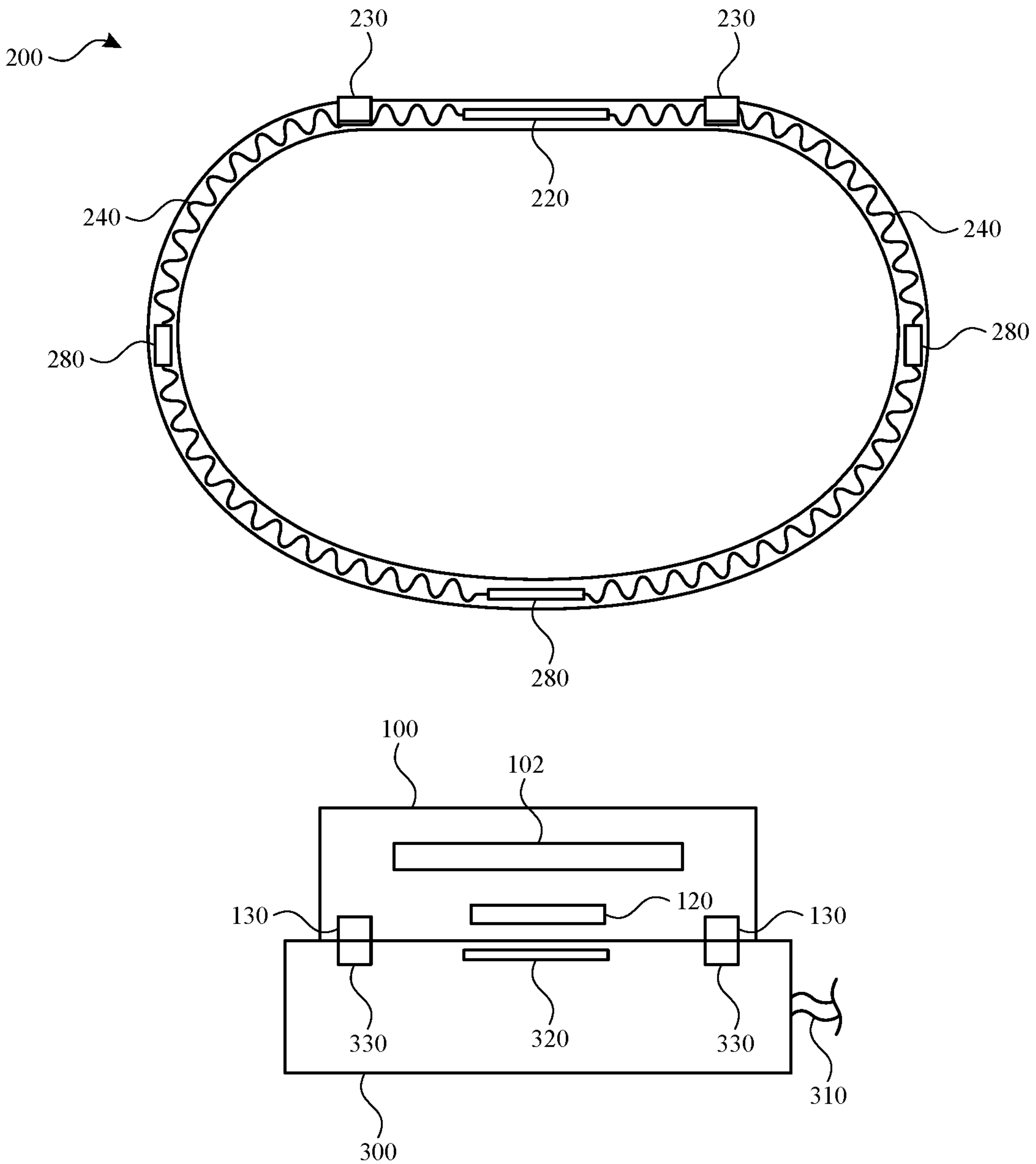
FIG. 4 illustrates a side sectional view of the watch of FIG. 3 with the band device and the watch body being separated, in accordance with some embodiments of the present disclosure.

According to some embodiments, for example as shown in FIG. 4, the watch body 100 can be separated from the band device 200. The watch body 100 can be stored away from the band device 200, for example on a charger device 300 connected to a power source 310. Both the watch body 100 and the band device 200 can continue to operate and provide their respective functions while separated.

The charger device 300 can include one or more charger engagement elements 330, and the body engagement elements 130 and the charger engagement elements 330 facilitate mechanical coupling or connection of the watch body 100 and the charger device 300. The charger engagement elements 330 can include one or more of the features described herein for any other engagement element.

The charger device 300 can include one or more charger communication elements 320, and the body communication elements 120 and the charger communication elements 320 can facilitate a communication and/or power link between the watch body 100 and the charger device 300. The charger communication elements 320 can include one or more of the features described herein for any other communication element. The charger device 300 can charge a battery of the watch body 100 with a power source 310. Thereafter, when the watch body is returned to the band device 200, the watch body 100 can transfer an amount of power to the band device 200.

As described herein, the band device 200 can include an electronic component 280, such as a sensor, that can be operated independently of the watch body 100. Such a sensor can continually monitor health metrics of the user or other conditions even when the watch body 100 is absent (e.g., on the charger device 300). When the watch body 100 is returned to the band device 200, a band communication element 220 of the band device 200 can transmit to the watch body 100 recorded information, for example, relating to health metrics of the user or other conditions.

Figure 5:
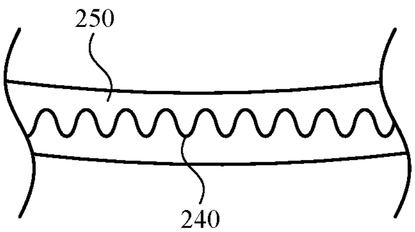
FIG. 5 illustrates a side sectional view of a portion of a band device in a contracted configuration, in accordance with some embodiments of the present disclosure.
Figure 6:
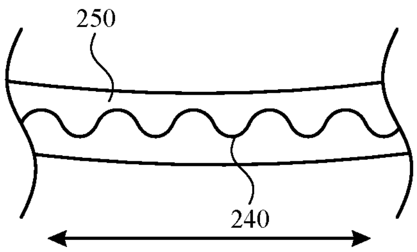
FIG. 6 illustrates a side sectional view of the portion of the band portion of FIG. 5 in an elongated configuration, in accordance with some embodiments of the present disclosure.

According to some embodiments, for example as shown in FIGS. 5 and 6, the band device can provide an ability to stretch and maintain operable connections (e.g., between a communication element and an electronic component of the band device). For example, the band body 250 can encase a connector 240 that provides a conductive path for communication of electrical signals. The connector 240 can form an undulating pathway that includes multiple curves. As shown in FIGS. 5 and 6, the connector 240 can change its shape to accommodate longitudinal stretching of the band body 250, for example when the user stretches the band body while donning the band device over a hand and onto the wrist. As the band body 250 stretches, the undulating pathway may elongate and change its curvature to extend a greater distance. Additionally or alternatively, the connector 240 can include a mixture of an elastic polymer and conductive particles to facilitate bending, flexing, and/or stretching without incurring damage (e.g., breaking, cracking, deformation). Additionally or alternatively, the connector 240 can include a flex circuit that includes a conductive layer, an insulation layer, and optionally a substrate layer. It will be understood that the connector 240 can be coupled to the band body 250 (e.g., from a molding procedure) and/or moveable within a chamber or void within the band body 250.

Figure 7:
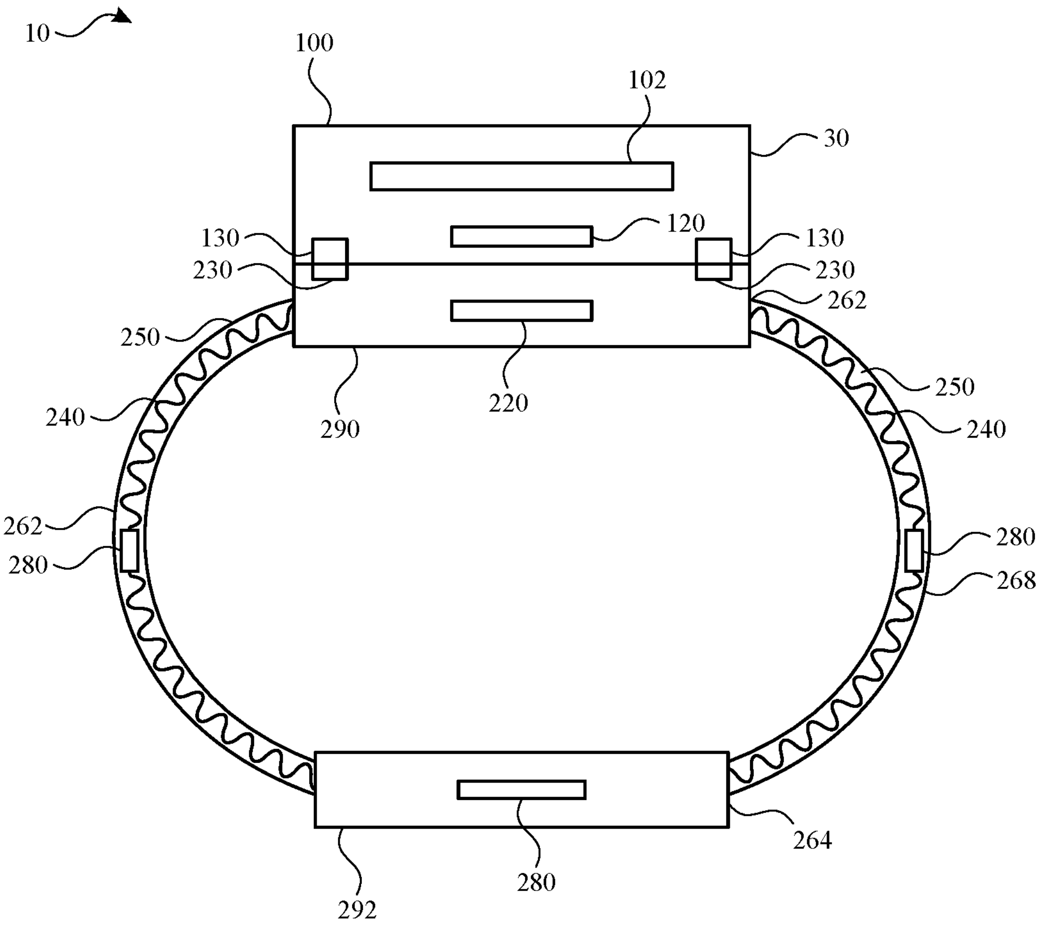
FIG. 7 illustrates a side view of a watch, in accordance with some embodiments of the present disclosure.

According to some embodiments, for example as shown in FIG. 7, the band device 200 can include one or more portions that each protect its contents. For example, the band device 200 can include band housings 290 and/or 292 that are rigid and not subject to flexing and/or deformation during normal use while being worn. By further example, the band housings 290 and/or 292 can be more rigid than the band body 250. The band housing 290 can include the band engagement element 230 and/or the band communication element 220 for engaging and interacting with the watch body 100 so that the watch body 100 is provided with a secure platform for coupling. The band housing 292 can include one or more electronic components 280 (e.g., sensors) to be maintained in a consistent location and/or orientation. The band housings 290 and/or 292 can optionally include a rigid material, such as a metal, ceramic, plastic, and the like. Other portions of the band device 200 can include the band body 250 (e.g., connecting the band housings 290 and/or 292 to each other) as described herein and/or a clasp or other mechanism for securing and adjusting the band device 200 to the user. The band device 200 can be secured (e.g., at a clasp) by one or more releasable locking mechanisms at one or more of the band housings 290 and/or 292. For example, mechanisms such as locks, latches, snaps, screws, clasps, threads, magnets, and/or pins can be included to lock the band body 250 to the band housings 290 and/or 292. The band device 200 can optionally remain locked from removal until a release mechanism is actuated. The release mechanism can be provided on an outer surface of the band housings 290 and/or 292 for access by a user. For example, the release mechanism can be provided on an outer surface of the band housings 290 and/or 292. It will be understood that any number of band housings can be provided, including band housings at the dorsal side 262, the palm side 264, the radial side 266, and/or the ulnar side 268 of the band device 200.

Figure 8:
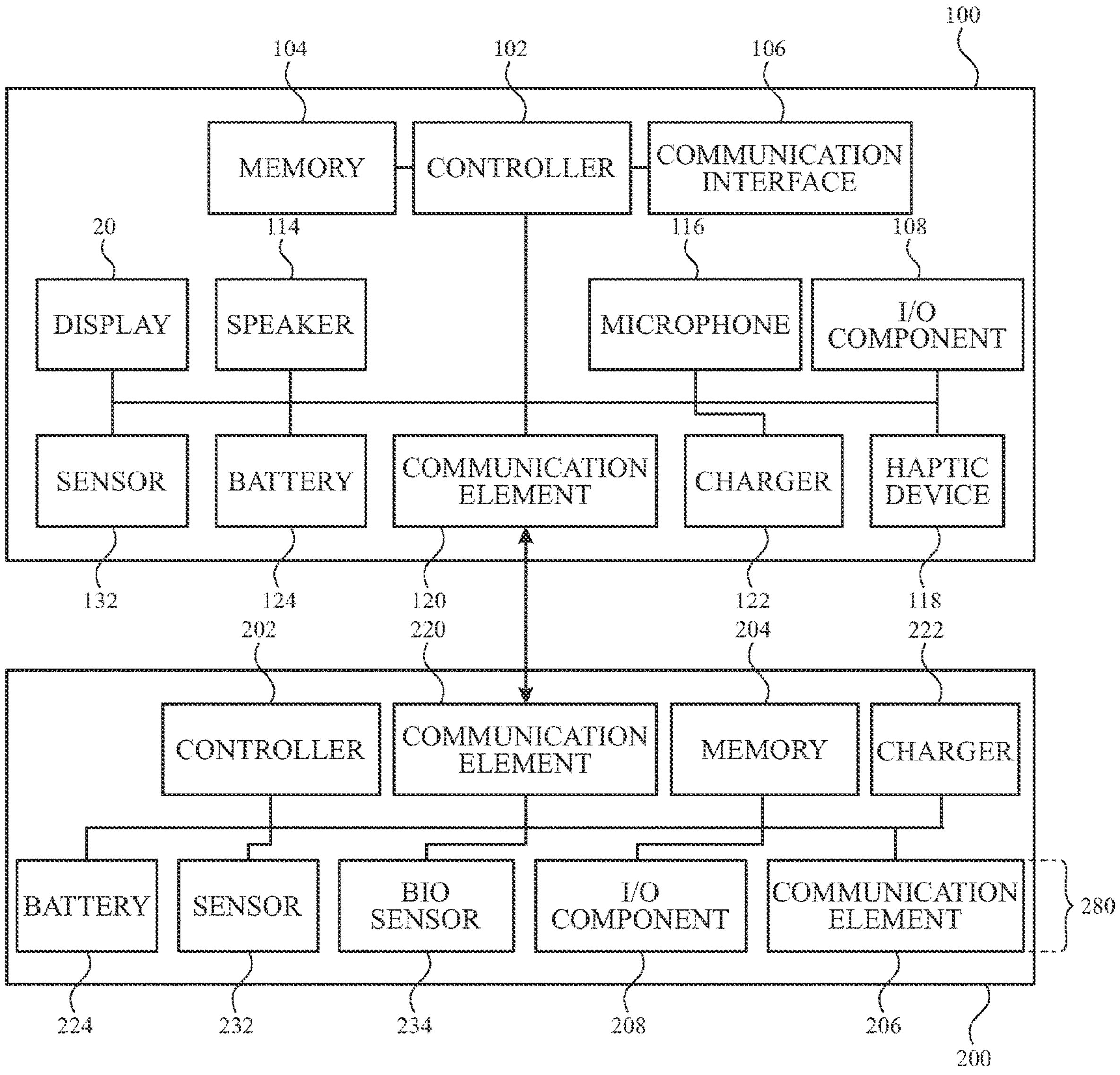
FIG. 8 illustrates a block diagram of a watch body and a band device, in accordance with some embodiments of the present disclosure.

FIG. 8 illustrates a block diagram of a watch body and a band device, in accordance with some embodiments of the present disclosure.

As shown in FIG. 8, the watch body 100 includes a controller 102 with one or more processing units that include or are configured to access a memory 104 having instructions stored thereon. The instructions or computer programs may be configured to perform one or more of the operations or functions described with respect to the watch body 100. The controller 102 can be implemented as any electronic device capable of processing, receiving, or transmitting data or instructions. For example, the controller 102 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The memory 104 can store electronic data that can be used by the watch body 100. For example, the memory 104 can store electrical data or content such as, for example, audio and video files, documents and applications, device settings and user preferences, timing and control signals or data for the various modules, data structures or databases, and so on. The memory 104 can be configured as any type of memory. By way of example only, the memory 104 can be implemented as random access memory, read-only memory, Flash memory, removable memory, or other types of storage elements, or combinations of such devices.

As further illustrated in FIG. 8, the watch body 100 can include components for interacting with a user. For example, the watch body 100 can include the display 20. The display 20 can provide visual (e.g., image or video) output. The display 20 may also provide an input surface for a sensor 132, such as a touch sensing device, a force sensing device, a temperature sensing device, a capacitive sensing device, a resistive sensing device, and/or a fingerprint sensor. The display 20 may be any size suitable for inclusion at least partially on or within the housing of the watch body 100 and may be positioned substantially anywhere on the watch body 100.

The watch body 100 can further include one or more other user interfaces for receiving input from and/or providing output to a user. Examples of such interfaces include a speaker 114, a microphone 116, a haptic device 118, and/or another I/O component 108. The haptic device 118 can be implemented as any suitable device configured to provide force feedback, vibratory feedback, tactile sensations, and the like. For example, in one embodiment, the haptic device 118 may be implemented as a linear actuator configured to provide a punctuated haptic feedback, such as a tap or a knock. By further example, the haptic device 118 may be implemented as a piezo transducer. Examples of other user interfaces include one or more buttons, dials, crowns, switches, or other devices can be provided for receiving input from a user.

As further shown in FIG. 8, the watch body 100 may include a communication component 106 that facilitates transmission of data and/or power to or from other electronic devices across standardized or proprietary protocols. For example, a communication component 106 can transmit electronic signals via a wireless and/or wired network connection. Examples of wireless and wired network connections include, but are not limited to, cellular, Wi-Fi, Bluetooth, infrared, RFID, and Ethernet.

As further shown in FIG. 8, the watch body 100 can include a battery 124 that is used to store and provide power to the other components of the watch body 100. The battery 124 may be a rechargeable power supply that is configured to provide power to the watch body 100 and/or the band device 200. The body 100 can also include a charger 122 to recharge the battery 124, for example, using a wireless (e.g., inductive) charging system. The watch body 100 can recharge the battery 224 of the band device 200, for example, by directing power from the battery 124 across the body communication element 120 and the band communication element 220 (e.g., using a wireless or inductive charging system). The battery 124 can be a replaceable battery, a rechargeable battery or, a tethered power source that receives power from a source external to the watch body 100, such as from a USB cable, Lightning cable, or other interface.

As further shown in FIG. 8, the band device 200 includes components to perform selected functions and to interact with the watch body 100.

As shown in FIG. 8, the watch body 100 can include the body communication element 120, and the band device 200 can include the band communication element 220 to facilitate a communication link between the watch body 100 and the band device 200. For example, the communication link can operably connect components of the watch body 100, such as the controller 102) to electronic components 280 of the band device 200.

As further shown in FIG. 8, the band device 200 can include a controller 202 with one or more processing units that include or are configured to access a memory 204 having instructions stored thereon. The controller 202 and/or the memory 204 of the band device 200 can be the same as, similar to, or different than the controller 102 and/or the memory 104 of the watch body 100.

Additionally or alternatively, the band device 200 can be controlled at least in part by the controller 102 of the watch body 100. For example, while the band device 200 is connected to the watch body 100, the controller 102 of the watch body 100 can operably connect to and/or control one or more components of the band device 200 via the communication link provided by the body communication element 120 and the band communication element 220.

Additionally or alternatively, the watch body 100 can be controlled at least in part by the controller 202 of the band device 200. For example, while the band device 200 is connected to the watch body 100, the controller 202 of the band device 200 can operably connect to and/or control one or more components of the watch body 100 via the communication link provided by the body communication element 120 and the band communication element 220.

The band device 200 and the watch body 100 can operate as auxiliary power sources for each other. As shown in FIG. 8, the band device 200 can include a battery 224 that is used to store and provide power to the watch body 100 and/or the band device 200. The band device 200 can recharge the battery 124 of the watch body 100, for example, by directing power from the battery 224 across the body communication element 120 and the band communication element 220. Other pathways are contemplated, such as another link or wireless charging, such as a charger 122 to recharge the battery 124, for example, using a wireless (e.g., inductive) charging system. The battery 224 can be a replaceable battery, a rechargeable battery, or a tethered power source that receives power from a source external to the band device 200, such as from a USB cable, Lightening cable, or other interface.

The band device 200 can provide sensing capabilities with one or more sensors. As shown in FIG. 8, the band device 200 can include one or more sensors 232. The one or more sensors 232 can be configured to sense substantially any type of characteristic such as, but not limited to, images, pressure, light, touch, force, temperature, position, motion, and so on. For example, the sensor(s) 232 may be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. The sensor 232 can be used to sense ambient conditions in a neighboring environment. The sensor 232 can be provided with exposure to the environment, for example with an opening in the band device 200.

The band device 200 can provide bio-sensing capabilities with one or more sensors. As shown in FIG. 8, the band device 200 can include one or more bio-sensors 234. The one or more bio-sensors 234 can include optical and/or electronic biometric sensors that may be used to compute one or more biometric characteristics. For example, a bio-sensor 234 can include a light source and a photodetector to form a photoplethysmography (PPG) sensor. Light can be transmitted from the bio-sensor 234, to the user, and back to the bio-sensor 234. The band device 200 can provide one or more windows (e.g., opening, transmission medium, and/or lens) to transmit light to and/or from the bio-sensor 234. An optical (e.g., PPG) sensor or sensors may be used to compute various biometric characteristic including, without limitation, a heart rate, a respiration rate, blood oxygenation level, a blood volume estimate, blood pressure, blood glucose level, or a combination thereof. One or more of the bio-sensors 234 may also be configured to perform an electrical measurement using one or more electrodes. The electrical sensor(s) may be used to measure electrocardiographic (ECG) characteristics, galvanic skin resistance, and other electrical properties of the user's body. Additionally or alternatively, a bio-sensor 234 can be configured to measure body temperature, exposure to UV radiation, and other health-related information.

The band device 200 can include a component for receiving input from a user, providing output to a user, and/or performing other functions. As shown in FIG. 8, the band device 200 can include one or more I/O components 208. Examples of such components include a speaker, a microphone, a display, a touch sensor, a haptic device, a camera, an optical sensor, a magnet, a gyroscope, an accelerometer, and/or another I/O component. The I/O components 208 can be used to detect and interpret user inputs. The I/O components 208 can be used to provide information to the user. The I/O components 208 can also be used to capture information relating to the user and/or the environment.

The band device 200 can provide a capability to communicate with other devices. The user can select such a band device when these communication links are desired. As shown in FIG. 8, a communication element 206 facilitates transmission of data and/or power to or from other electronic devices. As previously discussed, the communication element 206 can be used control, communicate with, and/or receive data from a watch band. In such a configuration, the communication element 206 can be positioned at a band retaining feature 16 of the band device. In other configurations, the communication element 206 can be used to control and/or communicate with other devices. For example, the communication element 206 can be used to connect to another device that performs diagnostic and/or repair functions. Accordingly, the communication element 206 can be used to provide a communication link to the band device 200 and/or the watch body 100 of the watch. The communication link provided by the communication element 206 can include standardized or proprietary protocols, such as with electronic signals via a wireless and/or wired network connection. Examples of wireless and wired network connections include, but are not limited to, Wi-Fi, Bluetooth, infrared, RFID, and Ethernet.

Accordingly, embodiments of the present disclosure provide a watch with a watch body and a band device that can be used together or independently of one another. The band device can provide continual operation of its functions even in the absence of the watch body. The assembly of the watch body and the band device can provide secure engagement, communication, and power sharing. Accordingly, neither the watch body nor the band device need to independently include components that provide every function that will be desired by the user. Instead, functions that are desired on a continual or long-term basis can be provided by the band device, and functions that are desired on an intermittent or short-term basis can be provided by the watch body.

Various examples of aspects of the disclosure are described below as clauses for convenience. These are provided as examples, and do not limit the subject technology.

Clause A: a watch comprising: a watch body comprising: a display; a controller; a body engagement element; and a body communication element; and a band device forming a continuous loop and comprising: a sensor; a band engagement element; a band communication element, wherein, when the watch body is attached to the band device, the controller is operably connected to the sensor via the body communication element and the band communication element; and a band body encasing the sensor, the band engagement element, and the band communication element.

Clause B: a band device comprising: a band body forming a loop and configured to stretch to adjust a diameter of the loop; a band engagement element configured to engage a watch body; a band communication element configured to communicate with the watch body; a sensor; and a flexible connector extending within the band body to operably connect the band communication element to the sensor, the flexible connector forming an undulating shape that is configured to flex when the band body stretches.

Clause C: a watch comprising: a watch body comprising: a display; a controller; a body engagement element; and a body communication element; and a band device forming a loop and comprising: a band engagement element on a first side of the loop for engaging the watch body; a band communication element on the first side of the loop for communicating with the body communication element; and a sensor on a second side of the loop that is opposite the first side.

an additional sensor that is positioned on a side of the loop that connects the first side of the loop to the second side of the loop.

One or more of the above clauses can include one or more of the features described below. It is noted that any of the following clauses may be combined in any combination with each other, and placed into a respective independent clause, e.g., clause A, B, or C.

Clause 1: the body engagement element and the body communication element are on a side of the watch body that is opposite the display.

Clause 2: the watch body further comprises: a microphone; a speaker; and a button for receiving input from user.

Clause 3: the body engagement element and the band engagement element comprise magnets.

Clause 4: the body communication element and the band communication element are configured to communicate with each other wirelessly.

Clause 5: the band device further comprises a battery; and the watch body further comprises a charger configured to wirelessly transmit power to the battery of the band device.

Clause 6: the band device further comprises a storage medium configured to store information based on detections made by the sensor while the watch body is not connected to the band device; and the band communication element is configured to transmit the information to the controller when the watch body is connected to the band device.

Clause 7: the sensor is configured to detect a characteristic of a user.

Clause 8: the sensor is configured to detect a characteristic of an environment external to the watch.

Clause 9: the band engagement element is on a first side of the loop; the band communication element is on the first side of the loop; and the sensor is on a second side of the loop that is opposite the first side.

Clause 10: an additional sensor that is positioned on a side of the loop that connects the first side of the loop to the second side of the loop.

Clause 11: the sensor comprises a photoplethysmography sensor.

Clause 12: the band device comprises: an upper housing containing the band engagement element and the band communication element; and a lower housing containing the sensor; and a band body extending between the upper housing and the lower housing.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference.

Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A watch comprising:

a watch body comprising:
- a display;
- a controller;
- a body engagement element; and
- a body communication element; and a band device forming a continuous loop while the watch body is released from the band device, the band device comprising:
- a sensor;
- a band engagement element configured to releasably attach the watch body to the band device;
- a band communication element, wherein, when the watch body is attached to the band device, the controller is operably connected to the sensor via the body communication element and the band communication element; and
- a band body encasing the sensor, the band engagement element, and the band communication element.

2. The watch of claim 1, wherein the body engagement element and the body communication element are on a side of the watch body that is opposite the display.

3. The watch of claim 1, wherein the watch body further comprises:
- a microphone;
- a speaker; and
- a button for receiving input from user.

4. The watch of claim 1, wherein the body engagement element and the band engagement element comprise magnets.

5. The watch of claim 1, wherein the body communication element and the band communication element are configured to communicate with each other wirelessly.

6. The watch of claim 1, wherein:
- the band device further comprises a battery; and
- the watch body further comprises a charger configured to wirelessly transmit power to the battery of the band device.

7. The watch of claim 1, wherein:
- the band device further comprises a storage medium configured to store information based on detections made by the sensor while the watch body is not connected to the band device; and
- the band communication element is configured to transmit the information to the controller when the watch body is connected to the band device.

8. The watch of claim 1, wherein the sensor is configured to detect a characteristic of a user.

9. The watch of claim 1, wherein the sensor is configured to detect a characteristic of an environment external to the watch.

10. A band device comprising:
- a band body forming a closed loop and configured to stretch to adjust a diameter of the closed loop;
- a band engagement element configured to engage a watch body;
- a band communication element configured to communicate with the watch body;
- one or more sensors; and
- a flexible connector extending within the band body to operably connect opposing sides of the band communication element to opposing sides of each of the one or more sensors, the flexible connector forming an undulating shape that is configured to flex when the band body stretches, wherein the flexible connector, the band communication element, and the one or more sensors form a continuous loop extending through the band body.

11. The band device of claim 10, wherein:
- the band engagement element is on a first side of the closed loop;
- the band communication element is on the first side of the closed loop; and
- each of the one or more sensors is on a second side of the closed loop that is opposite the first side.

12. The band device of claim 11, further comprising an additional sensor that is positioned on a side of the closed loop that connects the first side of the closed loop to the second side of the closed loop.

13. The band device of claim 10, wherein the sensor one or more sensors is configured to detect a characteristic of a user.

14. The band device of claim 10, wherein each of the one or more sensors is configured to detect a characteristic of an environment external to the band device.

15. A watch comprising:

a watch body comprising:

a display;

a controller;

a body engagement element; and a body communication element; and a band device forming a closed loop while the watch body is released from the band device, the band device comprising:

a band engagement element on a first side of the closed loop for engaging the watch body;

a band communication element on the first side of the closed loop for communicating with the body communication element; and a sensor on a second side of the closed loop that is opposite the first side.

16. The watch of claim 15, further comprising an additional sensor that is positioned on a side of the closed loop that connects the first side of the closed loop to the second side of the closed loop.

17. The watch of claim 15, wherein the sensor comprises a photoplethysmography sensor.

18. The watch of claim 15, wherein the band device comprises:

an upper housing containing the band engagement element and the band communication element; and a lower housing containing the sensor; and a band body extending between the upper housing and the lower housing.

19. The watch of claim 15, wherein the sensor is configured to detect a characteristic of a user.

20. The watch of claim 15, wherein the sensor is configured to detect a characteristic of an environment external to the watch.

* * * * *